United States Patent [19]

Turpening

[11] 4,059,820
[45] Nov. 22, 1977

[54] SEISMIC WAVE GENERATOR AND METHOD OF GEOPHYSICAL PROSPECTING USING THE SAME

[75] Inventor: Roger M. Turpening, Howell, Mich.

[73] Assignee: Environmental Research Institute of Michigan, Ann Arbor, Mich.

[21] Appl. No.: 634,146

[22] Filed: Nov. 21, 1975

[51] Int. Cl.² .............................................. G01V 1/10
[52] U.S. Cl. ..................... 340/15.5 SW; 340/15.5 CP; 181/113; 181/116; 89/1 J
[58] Field of Search ............... 181/113, 114, 116, 117, 181/119, 121; 340/15.5 SW, 15.5 CP; 102/23; 89/1 J

[56] References Cited

U.S. PATENT DOCUMENTS

| | | | |
|---|---|---|---|
| 3,344,881 | 10/1967 | White | 340/15.5 SW |
| 3,397,754 | 8/1968 | Roden | 340/15.5 SW |
| 3,638,175 | 1/1972 | Stone | 340/15.5 CP |
| 3,835,954 | 9/1974 | Layotte | 181/116 |
| 3,858,168 | 12/1974 | Barr, Jr. | 340/15.5 SW |

*Primary Examiner*—Howard A. Birmiel
*Attorney, Agent, or Firm*—Krass & Young

[57] ABSTRACT

A device for generating seismic waves in the earth employs an elongated open-ended barrel having its closed end adjustably supported on a base plate for inclinations with respect to the base from about 15° to 30° is also rotatable about an axis normal to the base. A cardboard tube with an interior waterproof coating and transverse dimensions complementary to the barrel is placed into the barrel so that its lower end is spaced from the closed end of the barrel. An explosive charge and a detonator are placed between the end of the barrel and the end of the tube. When the charge is detonated the resulting recoil impacts the base against the earth generating both compressional and shear waves which are recorded at a distance by a transverse seismometer. The barrel is then rotated through 180° about an axis normal to the base and a second firing is made, generating compressional waves with the same phase and magnitude as the first firing and shear waves of equal magnitude but opposite phase. The seismometer records the waves from this second firing and the two recordings are summed to eliminate the shear wave components and subtracted to eliminate the compressional wave components.

21 Claims, 5 Drawing Figures

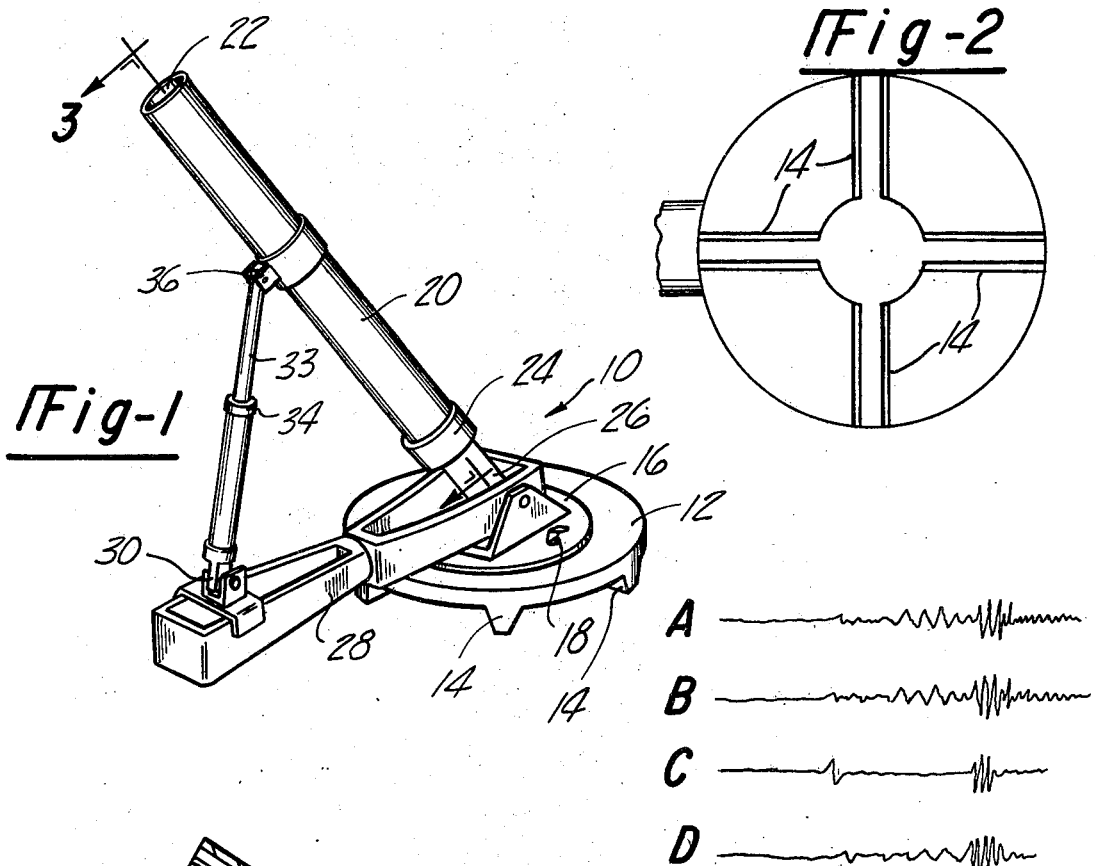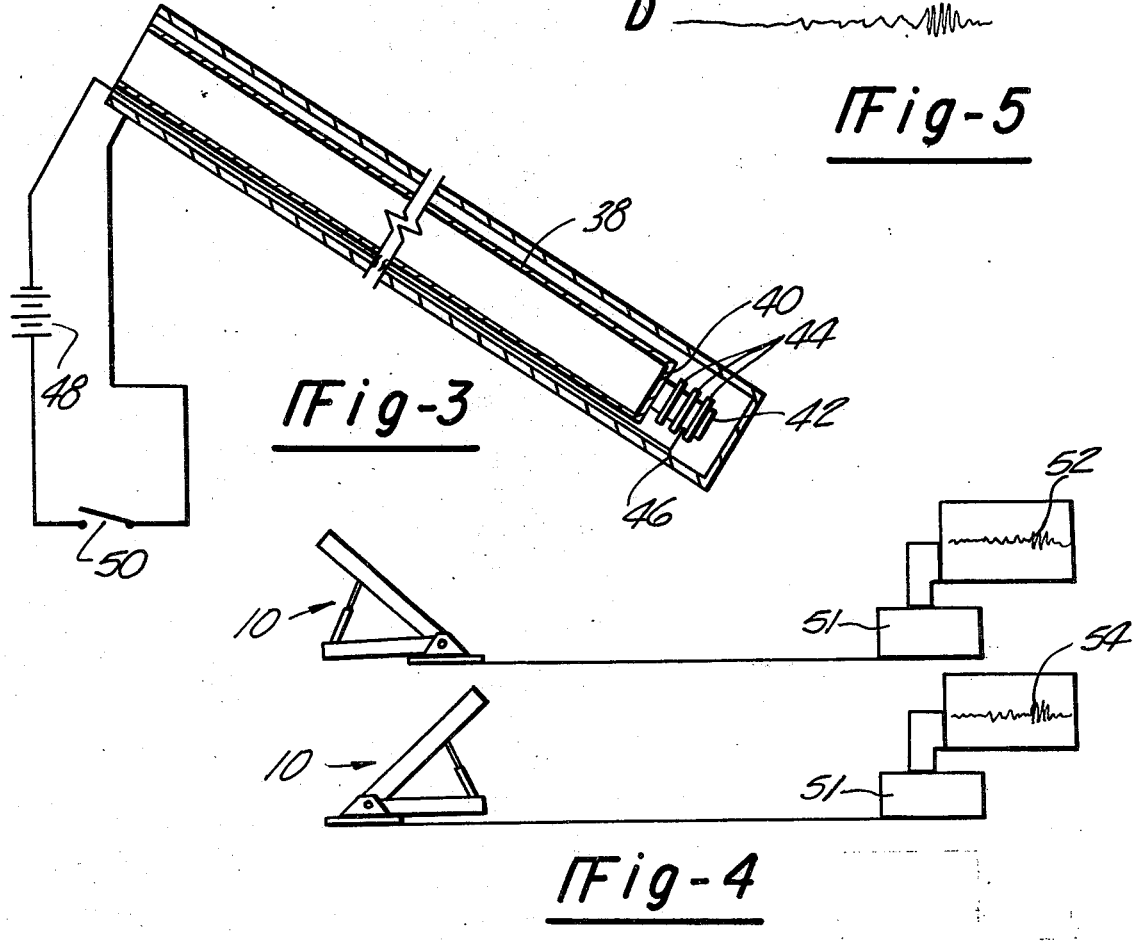

SEISMIC WAVE GENERATOR AND METHOD OF GEOPHYSICAL PROSPECTING USING THE SAME

BACKGROUND OF THE INVENTION

1. Field of the Invention

This invention relates to methods of geophysically prospecting by generating and detecting seismic waves and to a seismic wave generator which simultaneously generates compression and shear waves in a repeatable fashion.

2. Prior Art

Seismic surveying involves the generation of seismic waves in the earth by impacting the earth with a suitable generator, and the detection and analysis of the resulting waves at a remote point using a seismometer. The waves received by the seismometer are influenced by the subterranean geology and may be analyzed to determine the nature of that geology.

Prospecting of this type generally utilizes elastic waves involving earth particle movement in the direction of wave propogation. These waves, referred to as compressional or longitudinal waves, are readily generated by a vertical impact against the earth's surface by an explosion or a mechanical transducer. The technical literature has expressed the utility for seismic prospecting employing a second form of wave, termed shear waves, wherein the earth particle motion is generally normal to the direction of wave propogation. Shear waves have slower rates of propogation through the earth than do longitudinal waves so they produce a higher degree of revolution at a given frequency. This allows the detection of subterranean anomalies undetectable by the longitudinal waves and the detection of larger bodies with a higher degree of precision. Horizontally polarized shear waves are not converted into different wave types upon reflection or refraction from horizontal interfaces as is the case with compression waves and accordingly seismograms made from such waves are simpler to interpret.

Despite these recognized advantages, the use of shear waves in seismic prospecting has been greatly limited because of the unavailability of suitable shear wave generators. The difficulty encountered in designing such generators involves the manner of coupling an impact to the earth so that it will impart the desired shear motion to the earth's surface. The coupling device must prevent horizontal sliding motion of the force generator and convert the tendencies toward such motion into motion of the earth's surface. Previous shear wave generators have accomplished this attachment by using large masses to raise the friction between the generator and the earth or through the use of trenches, driven stakes or poured concrete slabs. These devices involved large and expensive static structures, incapable of being moved from site to site in the same manner as longitudinal wave generators, or have been capable of generating only very limited shear waves.

SUMMARY OF THE INVENTION

The present invention has addressed the problem of creating a strong source of shear waves which is portable and relatively inexpensive, by generating an explosion that produces a force at an angle to the earth's surface. This angled force acts to implant the base of the generator to the earth while generating the shear forces.

The preferred embodiment of the shear wave generator, which will subsequently be disclosed in detail, employs an open-ended barrel having its lower end adjustably supported on a base plate. The base plate is adapted to be retained on the earth's surface by gravity forces, with no special coupling device. The barrel is adapted to receive a charge of water supported in a highly frangible container. An explosive charge placed between the closed end of the barrel and the water charge is detonated and the water reacts to the explosion to create a relatively large recoil thrust. The resulting recoil force on the base firmly implants the base to the ground and also generates the shear wave.

The barrel is preferably positioned between about 15° and 30° with respect to the earth's surface. This angular range results in the conversion of the major portion of the recoil force into shear wave energy, yet firmly implants the base on the earth's surface. The adjustable mechanism allows the barrel to be rotated about an axis normal to the base so that its angle of inclination with respect to the base may be maintained while the direction of the shear waves generated is changed.

While the device of the present invention can be used to generate extremely strong shear waves, detectable at relatively great distances from the generator, it simultaneously generates longitudinal waves, making it somewhat difficult to analyze the resulting seismogram to isolate the shear waves if there is any misalignment between the generator and the seismometer and/or any geological heterogenity along the ray path. Accordingly, the present invention further contemplates a method for seismic prospecting which allows use of simultaneously generated longitudinal and shear waves and provides for their simple separation from the resulting seismic record. The separation stated here is to be used in addition to the commonly used array and frequency processing. The separation stated here applies to the body waves.

Broadly, this method involves use of the device of the present invention, or such other device as may be capable of generating simultaneous shear and longitudinal seismic waves. At least two firings of the device are made in such a way as to change the phase of the shear waves generated in the two firings. The change preferably involves a reversal in phase, whereby the phase of the shear waves generated by the second impact are shifted by 180° with respect to the shear waves generated by the first impact. Using the device of the present invention this reversal is simply achieved by maintaining the same angle of inclination of the barrel with respect to the ground for the two firings but rotating the barrel about the axis normal to the base plate through 180°. The resulting longitudinal waves will have the same phase and the same magnitude as the longitudinal waves generated by the first impact, if the impacts are of equal magnitude. The shear waves will likewise have the same magnitude but will be 180° out of phase with respect to one another. By combining the seismograms generated by the two firings, the longitudinal waves will be summed in phase but the shear waves will be summed out of phase and accordingly subtracted. Likewise, if two seismograms are subtracted from one another, the in-phase longitudinal waves will be subtracted, and will not appear in the sum, while the out of phase shear waves will add.

This technique can be practiced with a high degree of accuracy using the device of the present invention because of the high degree of repeatability of the waves generated by the device in successive firings. This results from the fact that the relatively large base of the present device does not modify the coupling properties between the base and the earth as a result of firing. Those prior art devices which used relatively small area coupling devices such as spikes modified the elasticity of the earth in the coupling area as a result of firing as to be incapable of producing a series of highly repeatable waves. For example, note the modification in the point of coupling between the seismic generator and the earth illustrated in FIG. 3 in U.S. Pat. No. 3,372,770, which discloses a prior art shear wave generator. The high degree of repeatability of the present device produces a series of almost identical seismograms on repeated firings of the device in the same location.

A series of seismograms obtained from two or more firings of the present device with a change in azimuthal angle between the firings, accordingly produces all of the information relating to the subterranean structure which would have only been obtainable in the prior art through the use of separate pressure wave generators and shear wave generators involving substantial static structures at the generator site.

Other objectives, advantages and applications of the invention will be made apparent by the following detailed description of a preferred embodiment of the apparatus. The description makes reference to the accompanying drawings in which:

FIG. 1 is a perspective view of a preferred embodiment of the device for generating shear waves;

FIG. 2 is a bottom view of the device of FIG. 1;

FIG. 3 is a sectional view through the barrel of the device of FIG. 1, filled with a charge, taken along line 3—3 of FIG. 1;

FIG. 4 is a schematic diagram illustrating the relationship between the seismic generators of FIGS. 1 and 3 and a seismometer during two sequential firings of the device in accordance with the method of the present invention; and FIG. 5 is a plot of wave forms recorded at the seismograph during the two firings of FIG. 4 and wave forms derived from these two primary seismograms to isolate the shear wave and longitudinal wave components.

Referring to the drawings, a shear wave generator formed in accordance with the present invention, generally indicated at 10, employs a circular cast steel base 12 having a plurality of radially extending ribs 14 on its underside. The base is adapted to be supported on a substantially horizontal surface, with the ribs 14 in contact with the surface. The base 12 may have a diameter of approximately three feet.

A central turntable 16 is supported on the upper side of the base 12. A manually actuable lock member 18 is supported on the turntable 16 and bears against the adjacent surface of the base 12 to lock the turntable in any selected rotational position with respect to the base 12.

A barrel 20 formed of steel tubing and having an open end 22 and a closed end 24 is supported above the turntable 18 by a ball joint mechanism 26 which allows the barrel to be supported in any selected angle relative to the base 12. The barrel may preferably be 5 feet long and have an internal diameter of about 4 inches. A horizontal support arm 28 has one end affixed to the turntable 16 and projects from the turntable above and parallel to the base about one foot beyond the edge of the base 12. A trunion mount 30 on the far end of the arm 28 pivotably supports one end of a telescopically adjustable support strut 32. The strut has a pair of sections which telescope within one another and are locked into position by a threaded sleeve 34. The other end of the strut 32 is connected by a trunion joint 36 to the barrel 20, near its open end 22. By adjusting the length of the strut, the angle that the barrel 20 makes relative to the base 12 may be controlled.

The barrel 20 is loaded with a charge contained in a cardboard tube 38 which may have a length of about four feet. The tube is internally coated with wax or other waterproofing material or a film plastic sleeve may be disposed within an unwaterproof cardboard tube. The tube preferably has an outer diameter slightly smaller than the inner diameter of the barrel, or approximately 3¾ inches. One end of the tube 38 is closed as at 40 and an elongated detonator 42 is attached centrally to the bottom 40 at the outer side of the tube so as to project longitudinally from the end of the tube. Three or four torroidal charge elements 44 are then arrayed on the detonator 42 and taped into place. The tube 38 is then loaded into the barrel 20 so that the closed bottom is slightly spaced from the closed end of the barrel and the charges 44 are supported within the volume between the closed end of the barrel and the tube end 40. A pair of electrical leads 46 each have one end connected to the detonator and are led between the outer diameter of the tube 38 and the inner diameter of the barrel, out of the open end of the barrel 22, to a suitable electrical power source 48 and detonating switch 50.

The tube is filled with water and is then ready for firing. Upon closing the detonating switch 50 the charge explodes causing vaporization of a large part of the water charge and expulsion of the remaining water and vapor from the barrel. The heavy recoil presses the base 12 against the supporting earth surface at an angle thus forcing the ribs 14 into the earth and generating both longitudinal and shear waves of relative magnitudes that are dependent upon the angle of the barrel relative to the supporting surface.

The method of use of the device 10 in seismic prospecting is schematically illustrated in FIG. 4. As shown in FIG. 4a, the device 10 is first prepared for firing by adjusting the angle of the barrel 20 within a range of from about 15° to about 30° with respect to the horizontal. The device is then fired and the resultant seismic waves are recorded by a conventional three-axis seismometer 51, located at a distance from the device 10 along an axis transverse to its axis of firing. The seismometer 51 may be located on the earth's surface or it might be located within a bore hole. The output of the seismometer 51 is recorded by suitable apparatus to produce a seismogram 52 containing traces representative of the outputs of the longitudinal seismometer element, the transverse seismometer element and the vertical seismometer element.

If the seismometer is perfectly aligned with the generator and the geology is homogeneous then the transverse element will only detect shear waves and the longitudinal detector compression waves; however, in most circumstances that alignment is not initially obtainable and the intervening geology is heterogeneous, therefore the transverse trace will contain signals attributable to longitudinal waves and vice versa. The following procedure is then used to "clean" the respective traces.

The turntable 16 is first released by rotating the handle of the lock member 18 and the turntable is rotated through 180° to the position illustrated in FIG. 4b. In this position, the barrel makes the same angle with the horizontal as did the barrel in the first firing, and accordingly the longitudinal waves produced by the second firing have the same relative magnitude as the waves produced by the first firing, assuming firing of equal magnitude. The shear waves similarly have equal magnitude but their phase is reversed by 180°. The outputs of the three axes of the seismometer of the second firing are recorded to produce a seismogram 54. The two outputs of the transverse seismometer recorded during the first and second firings are illustrated in FIGS. 5a and 5b. In order to isolate the shear waves from the influence of the simultaneously generated longitudinal waves, the seismograms of FIGS. 5a and 5b may be subtracted from one another to produce the seismogram illustrated in FIG. 5c. The subtraction process effectively shifts one of the seismograms by 180° with respect to the other. The components of the 180° shifted shear waves are thus summed together and the in phase longitudinal waves are subtracted from one another. The resultant wave form of FIG. 5c accordingly contains the plot of the shear waves alone. In order to determine the value of the shear wave at any point, the value on the plot of FIG. 5c would be divided by two.

In order to isolate the longitudinal waves from the shear waves using the longitudinal seismograms the two are added together in phase. The out of phase shear wave components are subtracted in this process. Again, the resultant values, as plotted in FIG. 5d, may be divided by two to determine actual longitudinal wave values at any time until after the firing.

I claim:

1. A device for generating seismic waves comprising: a base plate adapted to be supported on the earth; an elongated barrel having an open end and a closed end; adjustable support means for affixing the closed end of the barrel to the base plate so that the barrel projects at an angle of at least about 15° with respect to the base; means for containing water in a volume of the barrel spaced from the closed end; means for supporting an explosive charge in the volume between the closed end of the barrel and said means for containing water; and means for detonating said charge, whereby the recoil imposed on the base will force the base against the earth generating seismic waves.

2. The device of claim 1 wherein the means for adjustably supporting the closed end of the barrel to the base allows the angle of the barrel with respect to the plane of the base to be adjusted through an angular range encompassing the sector between about 15° and 90° with respect to the base.

3. The device of claim 2, further including means for rotatably supporting said means for adjustably supporting the closed end of the barrel to the base plate to allow rotation of the barrel about an axis normal to the plane of the base.

4. The device of claim 1 wherein said means for containing water constitutes a highly frangible tube having transverse dimensions complementary to the barrel adopted to burst upon detonation of the explosive charge.

5. The device of claim 4 wherein the tube is formed of cardboard and has a shorter length than the barrel and smaller outer diameter than the internal diameter of the barrel, and a waterproof coating on its interior.

6. The method of geophysical prospecting comprising: impacting the earth at least twice in sequence at the same point and with substantially equal force, the two impacts each occurring at acute angles with respect to the earth's surface so as to simultaneously generate longitudinal and shear waves in the earth, the angle of the shear waves generated by the two impacts, measured in a plane normal to the earth's surface, differing for the two impacts; recording both the longitudinal and shear waves resulting from the two impacts at the same point remote from the impact; and mathematically operating upon the resulting recordings to separate components attributable to the longitudinal and the shear waves generated by said impact.

7. The method of claim 6 wherein the angles of the two impacts with respect to the earth's surface are each between about 15° and about 45°.

8. The method of claim 6 wherein the step of mathematically operating on the resulting recordings includes the step of summing the records of the two seismic waves produced by the impacts to eliminate the shear wave components.

9. The method of claim 6 wherein the angle of the shear waves induced in the earth by the two impacts are 180° out of phase with respect to one another.

10. The method of claim 9 wherein the mathematical operations employed on the recordings to separate the longitudinal wave and shear wave components includes combining the recordings to derive the longitudinal wave signal and subtracting the recordings to derive the shear wave signals.

11. The method of claim 6 wherein both impacts are generated using the same device.

12. The method of claim 11 wherein the device used to generate the impact includes an elongated barrel supported at an angle of between about 15° and about 45° with respect to the earth's surface and means for generating an explosion within the barrel.

13. The method of geophysical prospecting comprising: impacting a first point on the earth at least twice at different angles relative to the earth's surface with a force to create therefrom simultaneous longitudinal and shear seismic waves in the earth; recording both the longitudinal and shear waves resulting from the impacts at a second point, remote from the first point; and mathematically operating upon the resulting recordings to separate components attributable to the longitudinal and the shear waves generated by said impact.

14. The method of claim 13 wherein the impact forces are applied to the earth at an acute angle to the earth's surface.

15. The method of claim 13 wherein the impact forces are applied at least twice in sequence at the same point with substantially equal force, the two impacts occurring at differing acute angles with respect to the earth's surface so each simultaneously generates longitudinal and shear waves in the earth, the angle of the shear waves generated by the two impacts, measured in a plane normal to the earth's surface, differing for the two impacts.

16. The method of claim 13 wherein the angles of the two impacts with respect to the earth's surface are each between about 15° and about 45°.

17. The method of claim 13 wherein the step of mathematically operating on the resulting recordings includes the step of summing the records of the two seismic waves produced by the impacts to eliminate the shear wave components.

18. The method of claim 13 wherein the angle of the shear waves induced in the earth by the two impacts are 180° out of phase with respect to one another.

19. The method of claim 18 wherein the mathematical operations employed on the recordings to separate the longitudinal wave and shear wave components includes combining the recordings to derive the longitudinal wave signal and subtracting the recordings to derive the shear wave signals.

20. The method of claim 13 wherein both impacts are generated using the same device.

21. The method of claim 20 wherein the device used to generate the impact includes an elongated barrel supported at an angle of between about 15° and about 45° with respect to the earth's surface and means for generating an explosion within the barrel.

* * * * *